United States Patent [19]

Kent, Jr.

[11] Patent Number: 4,875,255
[45] Date of Patent: Oct. 24, 1989

[54] FISH SCALING APPARATUS AND PROCESS

[76] Inventor: George W. Kent, Jr., 3522 Hampton Hwy., Hampton, Va. 23666

[21] Appl. No.: 277,692

[22] Filed: Nov. 30, 1988

[51] Int. Cl.$^4$ .......................................... A22C 25/02
[52] U.S. Cl. .......................................... 17/64; 17/65
[58] Field of Search ................. 17/64, 65, 51; 99/628, 99/630

[56] References Cited

U.S. PATENT DOCUMENTS

| | | | |
|---|---|---|---|
| 1,383,162 | 6/1921 | Sprague | 17/65 |
| 2,860,371 | 11/1958 | Krull | 17/64 |
| 3,304,574 | 2/1967 | Hamm | 17/64 |
| 4,324,020 | 4/1982 | Garwin et al. | 17/65 |
| 4,485,526 | 12/1984 | Opanaseako | 17/64 |
| 4,726,095 | 2/1988 | Bissell | 17/64 |
| 4,763,386 | 8/1988 | Wissbroecker | 17/64 |

FOREIGN PATENT DOCUMENTS

| | | | |
|---|---|---|---|
| 1151920 | 2/1958 | France | 17/64 |
| 839464 | 6/1981 | U.S.S.R. | 17/64 |

Primary Examiner—Willis Little
Attorney, Agent, or Firm—Wallace J. Nelson

[57] ABSTRACT

A fish scaling apparatus and process is disclosed wherein a vertical stand 11 supports a pair of elongated, concentrically spaced, perforated drums 20,22 (FIGS. 1–7). An access door 23 is provided along the length of the outer drum 20 to permit loading and unloading of a quantity of fish in the space d between the two drums. Drums 20,22 are provided, respectively, with a plurality of dimpled perforations 25,26 through the sidewall thereof with each perforation having rough edges facing toward the space between the drums (FIG. 3a). A perforate water pipe 13 serves as an axle about which the drums 20,22 rotate and an electric motor 40, in conjunction with a selection of pulleys, (FIGS. 1–2), chain and sprocket wheels (FIG. 5), and/or gears (FIG. 10), supply the rotative force for the drums. Drums 20,22 are designed to rotate together (FIGS. 1–7), separately (FIGS. 8–9), or in opposite directions (FIG. 10). Rotation of one or both drums causes the fish therebetween to engge the rough edge perforations 25,26 and the scraping movement thereover effects removal of the fish scales. Most of the removed scales pass through the outer drum perforations 25 and are collected on a screen grid 39 disposed over drain 29 and within a removable drip pan 28 that is releasably supported by the stand (FIG. 4).

10 Claims, 3 Drawing Sheets

U.S. Patent    Oct. 24, 1989    Sheet 1 of 3    4,875,255
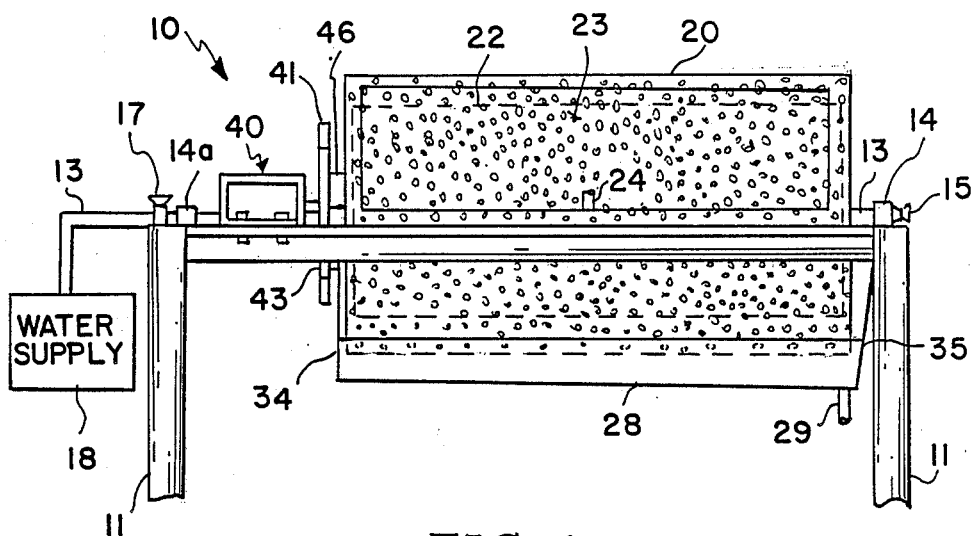
FIG. 1
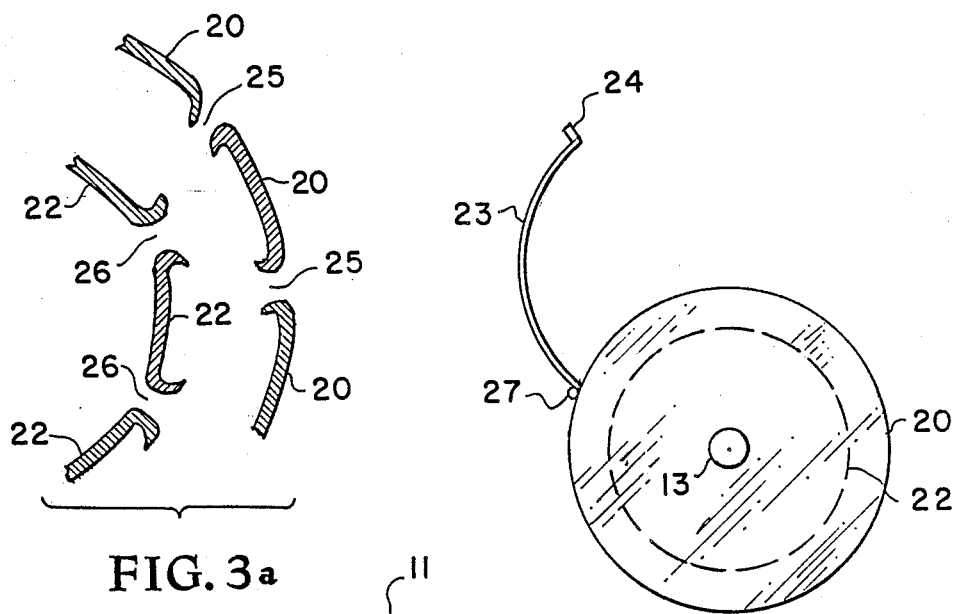
FIG. 3a
FIG. 3
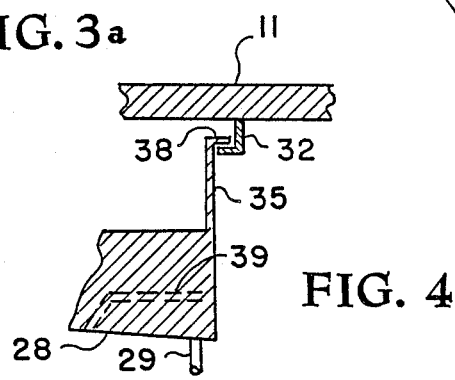
FIG. 4

FISH SCALING APPARATUS AND PROCESS

FIELD OF THE INVENTION

This invention relates generally to a fish scaling apparatus and relates specifically to a rotating drum scaling apparatus and process for removing scales from a quantity of fish.

BACKGROUND OF THE INVENTION

Numerous attempts have been made to provide a suitable fish scaling apparatus that may be employed by commercial fish processing plants. Some of these devices have employed rotating drums with sharp edge perforations therein serving as the abrasive mechanism to remove scales from the fish. For various reasons, these devices have not proved entirely satisfactory, and it is an object of the present invention to provide an improved fish scaling apparatus and process that can scale large quantities of fish in a reasonable period of time and without damage to the scaled fish.

Another object of the present invention is a fish scaling apparatus that is effective in scaling flounder and other flat-type fish as well as fish having an essentially round cross-sectional body area.

A further object of the present invention is a process of simultaneously removing the scales from all sides of each fish in a quantity of fish.

SUMMARY OF THE INVENTION

According to the present invention, the foregoing and additional objects are attained by providing a vertical stand supporting a pair of elongated, concentrically spaced, perforated drums. An access door is provided along the length of the outer drum to permit loading and unloading of a quantity of fish in the space between the two drums. Each drum is provided with a plurality of dimpled perforations through the sidewall thereof with each perforation having rough edges facing toward the space between the drums. A perforate water pipe serves as an axle about which the drums may rotate and an electric motor in conjunction with a selection of pulleys, chain and sprocket wheels and/or gears supply the rotative force for the drums. The drums are designed to rotate together, separately, or in opposite directions. Rotation of one or both drums causes the fish therebetween to engage the rough edge perforations and the scraping movement thereover effects removal of the fish scales. Most of the removed scales pass through the outer drum perforations and are collected on a screen grid disposed over a drain within a removable drip pan that is also supported by the stand.

BRIEF DESCRIPTION OF THE DRAWINGS

A more complete appreciation of the invention and many of the attendant advantages thereof will be more readily apparent as the same becomes better understood by reference to the following detailed description when considered in connection with the accompanying drawings wherein:

FIG. 1 is a side view of the fish scaling apparatus of the present invention;

FIG. 3 is a part schematic, part sectional view of the drum mechanisms shown in FIGS. 1 and 2 and illustrating the access door therein in the open position;

FIG. 3a is an enlarged schematic representative of the perforations formed through the sidewalls of both drums of the present invention;

FIG. 4 is an enlarged part sectional, part schematic view illustrating one end of the drip tray retention mechanism;

DETAILED DESCRIPTION

Figure 2:
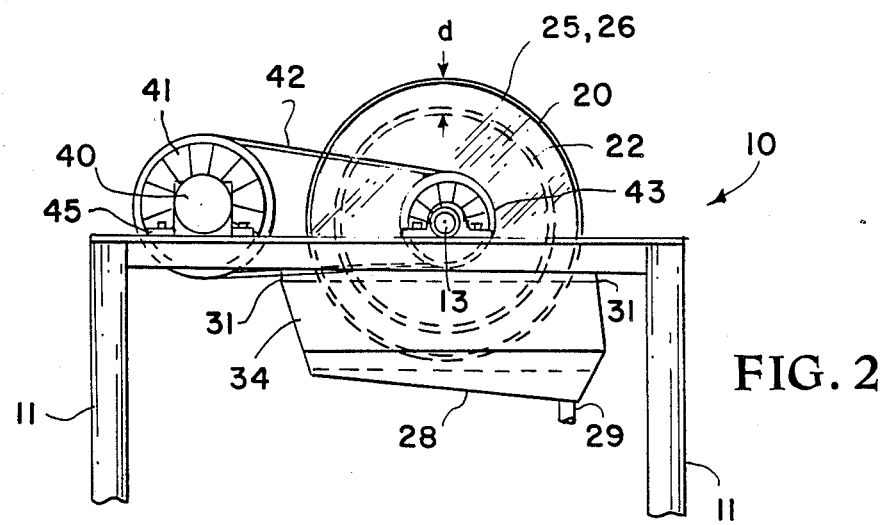
FIG. 2 is an end view of the fish scaling apparatus shown in FIG. 1.

Referring now to the drawings, FIG. 1 shows a side view of the fish scaling apparatus according to the present invention and designated generally by reference numberal 10. Scaling apparatus 10 includes a support stand 11 having an elongated water pipe 13 extending along the entire length thereof. A pair of restraining straps 14,14a are disposed on the ends of water pipe 13 and serve to secure it to stand 11. One end of water pipe 13 is closed by a plug 15 and the other end has a valve 17 therein leading to a pressurized water supply 18. Water pipe 13 serves as an axle for spaced, concentrically arranged drums 20,22 and is provided with one-eighth inch diameter perforations spaced approximately two inches apart along the portion of the length thereof positioned within the drums, as will be further explained hereinafter. Outer drum 20 is provided with an access door 23 extending substantially the entire length thereof and serves to permit the loading and unloading of a quantity of fish in the space provided between the drums, as will be further explained hereinafter.

Access door 23 is of arcurate configuration extending substantially one-fourth the circumference of outer drum 20 and provides access to the space between outer drum 20 and inner drum 22. A conventional latching mechanism 24 serves to secure door 23 in the closed position shown in FIG. 1 and, when unlatched, door 23 pivots about a piano type hinge 27 (FIG. 3) for opening and closing thereof. Each of drums 20,22 are provided with multiple rows of dimpled perforations 25, 26 through the sidewalls thereof. In the interest of clarity, only some of the perforations 25,26 are illustrated but it is to be nderstood that perforations 25,26 are disposed in staggered relationship along substantially the entire sidewall of each of drums 20,22.

As shown more clearly in FIG. 3a, the dimpled perforations 25,26 terminate in rough surface edges with the rough edges on each drum 20,22 being directed toward the space between the two drums to facilitate scale removal from the fish disposed between the drums, as will be further explained hereinafter.

A drip tray 28 is releasably secured to stand 11 beneath drums 20,22 to receive the water and fish scales from the drums during a scaling operation. Drip tray 28 is inclined slightly, as shown in FIGS. 1 and 2, to direct water received therein toward outlet 29 leading to a waste disposal system. Drip tray 28 is slidably retained beneath drums 20,22 on support stand 11 by a pair of brackets 31,32 integral with stand 11. Brackets 31,32 extend beneath stand 11 a distance at least equal to the width of drip tray 28. Drip tray 28 is provided with a vertically extending side along the length of each end thereof, as designated by reference numerals 34,35. Each of sides 34,35 terminate in a lip, one not shown, and the other illustrated in FIG. 4 and designated by reference numeral 38. Lip 38 and the other for extension 34, and not shown, slidably extend along the length of depending brackets 31,32 to releasably support drip tray 28 beneath drums 20,22. A removable wire mesh grill 39 is provided within drip tray 28 and serves to prevent the removed fish scales from entering drain outlet 29.

Figure 6:
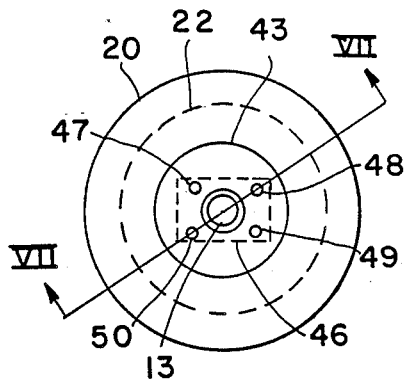
FIG. 6 is a schematic end view showing the pulley connection for the inner and outer drum members illustrated in FIGS. 1 and 2.
Figure 7:
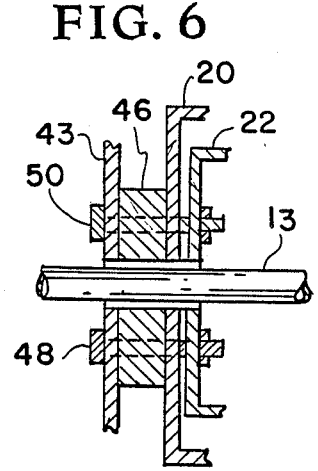
FIG. 7 is a sectional view taken along lines VII—VII of FIG. 6.

As shown more clearly in FIG. 2, an electric motor 40 drives a first pulley 41, connected via belt 41, to a second pulley 43. Motor 40 is supported on stand 11 by bolted strap 45. Pulley 43 is rotatably supported by water pipe axle 13 and bolted to bind element 46 via bolts 47,48,49,50, as shown more clearly in FIGS. 6 and 7. Suitable bushings, not designated, are provided along the end lengths of water pipe axle 13 to facilitate relative movement of the rotatable parts thereabout.

Figure 5:
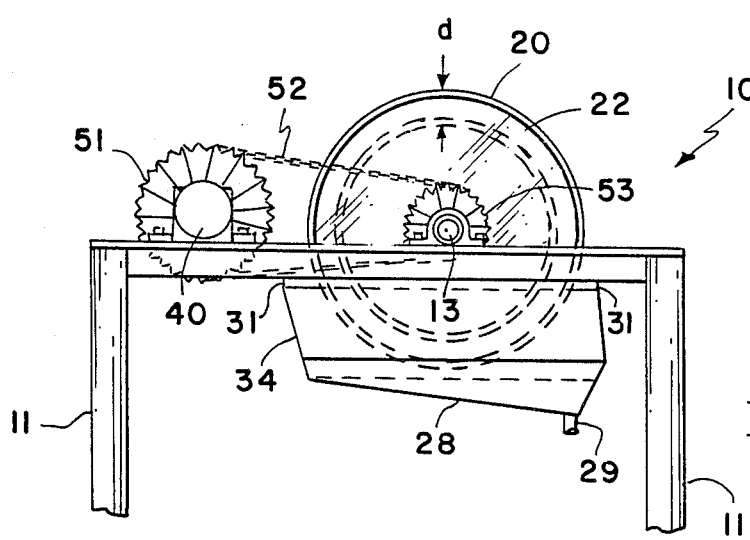
FIG. 5 is an end view similar to FIG. 2 and illustrating a chain and sprocket wheel drive for drum rotation.

Referring now more particularly to FIG. 5, a modified drive mechanism for effecting drum rotation is illustrated. In this embodiment, a first sprocket wheel 51 is driven by electric motor 40. A sprocket chain connects wheel 51 to a second sprocket wheel 53. The remaining structure of this embodiment is identical to that described hereinbefore.

Figure 8:
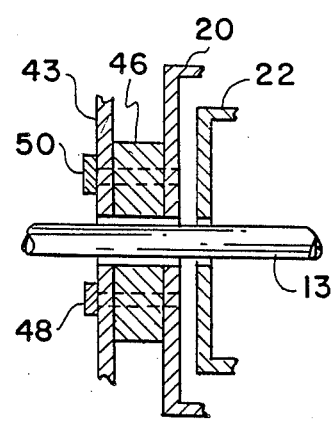
FIG. 8 is a sectional view of a modified drive connection for driving the outer drum only.

Referring now to FIG. 8, an alternate embodiment of the drive mechanism is shown wherein only outer drum 20 is directly driven and inner drum 22 is essentially free-floating. In this embodiment, binder element 46 is connected to pulley 43 and outer drum 20 via bolts 48,50 and two others, not shown. The connecting bolts 48,50 and the others, not shown, extend only through outer drum 20 and, thereby, leave inner drum 22 unattached. Thus, inner drum 22 is supported only by its bushing disposed about water pipe axle 13.

Figure 9:
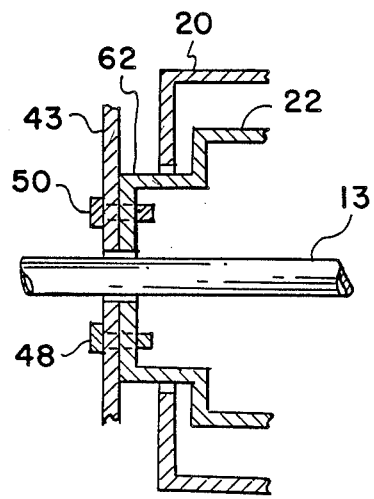
FIG. 9 is a sectional view similar to FIG. 8 and illustrating a modified drive connection for driving the inner drum only; and, FIG. 10 is a partial end view of the drum assembly shown in FIG. 9 and modified to employ a gear drive for rotating the inner and outer drums in opposite directions.

FIG. 9, illustrates another embodiment of the drive mechanism of the present invention wherein inner drum 22 is directly driven and outer drum 20 remains essentially free-floating. In this embodiment inner drum 22 is provided with a hug extension 62 and pulley 43 is bolted directly to this hub extension via bolts 48,50 and others, not shown. The end plate of outer drum 20 is modified to have the center opening therethrough positioned about hub 62 of inner drum 22. A suitable bushing, not designated, is provided between hub 62 and the center opening in the end plate of drum 20 to reduce the friction therebetween and facilitate relative rotation between the drums. Thus, when pulley 43 is rotated by motor 40, only inner drum 22 will be directly rotated with outer drum 22 being "free-floating" therearound.

Figure 10:
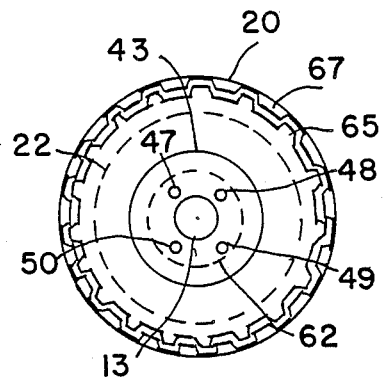

Referring now to FIG. 10, another embodiment of the present invention is illustrated wherein drums 20,22 are designed for opposite relative rotative movement. In this embodiment, inner drum 22 is provided with a hub element 62, as in the embodiment of FIG. 9, and drum 20 is similarly adapted for relative rotation therearound. An annular gear 65 is disposed between pulley 43 and hub 62 and bolted thereto via bolts 47,48,49,50. A ring gear 67 is secured to the end plate of outer drum 20 and disposed in meshing engagement with annular gear 65. Thus, as pulley 43 rotates inner drum 22, the attached annular gear 65, meshing with ring gear 67 on outer drum 20, causes the two drums 20,22 to rotate in opposite directions.

OPERATION

The operation of the invention is believed apparent from the above description. For example, referring to the embodiment of FIG. 1, a quantity of fish is deposited, through door 23 of outer drum 20, within the spacing formed between inner drum 22 and outer drum 20. Motor 40 is actuated by a suitable switch or plug-in, not shown, leading to a conventional 120 v electric power supply. Motor 40 turns first pulley 41 (FIG. 1) causing belt 42 to turn second pulley 43 and attached drums 20,22. Valve 17, leading from water supply 18 is opened to permit a spray or small amount of water to exit the perforations in water pipe axle 13 and be received by inner drum 22. The fish disposed between drums 20,22 are moved along the sides thereof until gravity causes slippage back toward the bottom of the drums. As the fish move against drums 20,22 the rough edges of perforations 25,26 therein scrape away the scales. The removed scales move through perforations 25 in outer drum 20 and are received, along with the water flowing from pipe 13, by drip tray 28. The water flow is controlled to ensure that the fish just stay wet and that the removed scales are directed toward the perforations in outer drum 20. The removed scales are retained on wire mesh grill 39 while the wash water flows through outlet 29 to the waste area. After all fish are throughly scaled, motor 40 is inactivated and drip tray 28 slidably removed from support stand 11, to remove the scales on screen 39, and then, drip tray 28 is replaced. Drums 20,22 are then manually turned to position access door 23 at the bottom thereof, door 23 opened and the scaled fish deposited in drip tray 28 for further processing.

The chain and sprocket wheel drive of the embodiment shown in FIG. 5 operates in the same manner as that described above.

In the embodiment of FIG. 8, only the outer drum 20 is positively driven by motor 40 and inner drum 22 may, or may not, turn. Normally, inner drum 22 would not be expected to rotate however, the fish load may cause a binding of some of the fish between the two drums and inner drum 22 would rotate, along with outer drum 20, until gravity forces cause the fish to slide toward the bottom with the same scraping, scaling result.

Similar opertion would occur in the embodiment of FIG. 9 wherein inner drum 22 is directly driven by pulley 43 and outer drum 20 is free floating for rotation about hub extension 62 disposed on each end of inner drum 22.

In FIG. 10, annular gear 65, attached to hub 62 of inner drum 22, is driven by pulley 43. Ring gear 67, integral with the end plate of outer drum 20, meshes with annular gear 65 and causes drum 20 to rotate in the opposite direction from inner drum 22.

No specific materials or dimensions have been discussed for constructing the present invention and aluminum or other conventional non-corrosive materials having operable dimensions are considered within the scope of the invention. In a specific embodiment of the present invention, outer drum 20 was constructed of sixteen gauge aluminum plate and inner drum 22 constructed of twenty-four gauge aluminum plate. The dimpled perforations 25,26 formed in respective drums 20,22 were first drilled with a one-quarter inch drill bit and then individually punched with a metal punch to create the rough edges and provide the dimpled effect necessary to position the rough edges away from the plate surface. Perforations 25,26 are formed in staggered rows approximately two inches from each other over the entire circumference of drums 20,22, including access door 23. The manual punching of the individual perforations provides non-uniform dimensions to the perforations and the scaling operation is assisted by this non-uniformity.

After the perforations are formed, the sheet material is rolled, welded, or otherwise conventionally secured, into a tubular configuration with the rough edges of perforations 26 on the smaller or inner drum 22 facing outward and the rough edges of perforations 25 on outer drum 25 facing inward. As formed, some of the perforation edges have very sharp segments and to prevent these from cutting and damaging the fish during a scaling procedure, it is sometimes necessary to buff the edges with brick or other abrasive materials. This may be done by hand or by tumbling the brick between the drums after complete fabrication of the assembly.

End plates for drums 20,22 are cut from the same aluminum stock material and welded, bolted, or otherwise conventionally attached to the assembled perforated tubular sections. Door 23 is cut from the larger perforated tubular section with suitable hinge 27 and latch 24 being added thereto in a conventional manner. Access door 23 is of sufficient length and width to permit the finished inner drum 22 to be positioned within drum 20 for the embodiments illustrated by FIGS. 1-8.

In the embodiments of FIGS. 9 and 10, the outer tubular section of outer drum 20 would be positioned around completed inner drum 22 prior to attachment of the end plates to outer drum 20. The end plates for drum 22 in the embodiments of FIGS. 9 and 10 have hub member 62 integrally secured thereto by any suitable conventional attachment, such as welding, bolting, or the like.

Although only one end of the inner and outer drums has been shown and described in detail for the various embodiments, it is to be understood that the end not shown is of similar construction. For example, in the embodiments of FIGS. 1-7, the opposite ends of that shown for drums 20,22 are connected by a binder plate element similar to binder element 46 shown, the only difference being the absence of a pulley 43 on that end.

In the embodiment of FIG. 8, no binder element need be employed on the end opposite to that shown since the two drums are not directly attached, and only outer drum 20 is positively driven by the motor-pulley drive.

In the embodiments of FIGS. 9 and 10, the opposite ends of the outer and inner drums 20,22 are identical to those shown but no pulley is attached to inner drum 22.

In a specific embodiment of the present invention inner drum 22 had a diameter of approximately nine inches, and a length of approximately twenty-nine inches, while outer drum 20 had a diameter of appoximately inches and a length of approximately thirty inches. This left a space, for depositing the fish to be cleaned, of approximately three inches between the drums as designated by arrows d in FIG. 2. The motor, pulley and belt arrangement in this embodiment was selected to drive drums 20,22 at a rate of thirty revolutions per minute.

The water flow from water pipe axle 13 was controlled to just ensure that the fish housed in the scaling space between the two drums stayed wet.

Although the invention has been described relative to specific embodiments thereof, it is not so limited. There are numerous variations and modifications thereof that will be readily apparent to those skilled in the art in the light of the above teachings.

For example, the invention is not restricted to the specific materials defined for the specific examples described herein, and other materials and gauge thicknesses thereof may be employed. Specifically, any material having non-corrosive characteristics and that may be punched or otherwise provided with the necessary abrasive surfaces between the drums to remove scales from fish are considered within the scope of the present invention and may be employed to construct drums 20,22. Further, either or both of drums 20,22 may be constructed of multiple perforated material pieces connected in annular overlapping relationship. The rough ends of these overlapping sections, facing the space between the drums, provide additional scraping mechanism acting on any fish moving thereagainst as the drums rotate.

Also, drive mechanisms other than those specifically described may be employed to drive drums 20,22 simultaneously, separately or in opposite directions, as so desired. These alternate drive mechanisms may include, but are not limited to, various gear systems. Also, the speed of the rotating drums may be varied by changing the motor, pulleys, sprocket wheels, or gear arrangements, as so desired, to obtain the optimum scaling conditions for specific fish. The size of the apparatus may also be changed for increasing or decreasing the load capabilities thereof. Loads of one-fourth to one-third of the volume of the spacing between the two drums are considered normal operating quantities but loads up to one-half of this volume are also considered operable.

The specific embodiment described has a space d of approximately three inches and is specifically designed for Flounder, Spot, and the like. For larger round type fish, for example Trout, this spacing may need increasing to prevent the fish from becoming bound between the drums.

These and other variations and modifications of the present invention will be readily apparent to those skilled in the art without departing from the spirit and scope of the appended claims.

Thus, the invention may be practiced other than as specifically described.

What is claimed is:

1. A fish scaling apparatus comprising in combination:
    (a) a support stand,
    (b) an inner and an outer hollow elongated drum disposed in spaced concentric relationship and supported by said support stand,
    (c) an access door in said outer drum for loading and unloading a quantity of fish in the space between said inner and said outer drum,
    (d) an axle extending along the common axis through said drums,
    (e) means for rotating said pair of drums about said axle,
    (f) a plurality of dimpled perforations provided through the sidewall of each said inner and said outer drum,
    (g) said dimpled perforations on said inner drum being directed toward the exterior surface thereof and provided with rough edge surfaces directed toward the interior surface of said outer drum, (h) said dimpled perforations on said outer drum being directed toward the interior surface thereof and provided with rough edge surfaces directed toward the exterior surface of said inner drum, and (i) means connecting said inner and said outer drums whereby said inner and said outer drums rotate as a unit, whereby, as said drums are rotated the fish disposed between said drums move against the rough edge surfaces on both said drums and are scaled thereby.

2. The fish scaling apparatus of claim 1 wherein said axle is a perforate water pipe and connected to a water supply to provide a quantity of water to said drums and including a removable drip pan disposed beneath said drums to catch the water flowing through said drums during a scaling procedure.

3. The fish scaling apparatus of claim 2 including a grid strainer disposed within said drip pan to catch and separate the scales removed from the fish during a scaling procedure from the water exiting said drip pan.

4. The fish scaling apparatus of claim 1 wherein said means for rotating said pair of drums includes a motor driven sprocket chain drive connected to said drums.

5. The fish scaling apparatus of claim 1 wherein said means for rotating said pair of drums includes a motor driven belt and pulley system connected to said drums.

6. A fish scaling appratus comprising in combination:
a support stand;
a pair of spaced, concentric, perforated drums supported by said stand;
an access door in one of said drums to permit the loading and unloading of a quantity of fish in the space between said drums;
said perforated drums being provided with rough edges on the perforations therein with said rough edges on each drum facing the space provided between said drums;
an axle extending through the length of said drums;
means for providing rotation of at least one of said drums to thereby cause any fish disposed in the space between said drums to move against the rough edges of the perforations in said drums and effect scaling of the fish;
wherein one of said drums is free-floating and the other of said drums is connected to and rotated by said means for providing rotation.

7. The fish scaling apparatus of claim 6 wherein both said drums rotate in the same direction.

8. The fish scaling apparatus of claim 6 wherein said means for providing rotation of at least one of said drums comprises an electric motor, belt and pulley drive.

9. The fish scaling apparatus of claim 6 wherein said means for providing rotation of at least one of said drums comprises an electric motor, sprocket wheel and chain drive.

10. A process of scaling a quantity of fish comprising:
providing a pair of spaced, concentrically arranged perforated drums with the perforations on the two drums having rough edge surfaces facing the space formed between the spaced drums,
depositing a quantity of fish in the space between the perforated drums,
rotating both said drums in the same direction to effect movement of the quantity of fish disposed between the drums, whereby as said drums rotate, the quantity of fish will slide against the rough edge surfaces of the perforated drums and result in the scales being scraped from the fish by the rough edge surfaces of the perforations.

* * * * *